United States Patent [19]

Singer

[11] Patent Number: 4,948,110
[45] Date of Patent: Aug. 14, 1990

[54] TRANSFERRING-OUT FACILITY

[75] Inventor: Helmut Singer, Bad Essen, Fed. Rep. of Germany

[73] Assignee: Kolbus GmbH & Co. KG, Rahden, Fed. Rep. of Germany

[21] Appl. No.: 440,663

[22] Filed: Nov. 22, 1989

Related U.S. Application Data

[63] Continuation of Ser. No. 210,394, Jun. 23, 1988, abandoned.

[30] Foreign Application Priority Data

Jun. 29, 1987 [DE] Fed. Rep. of Germany ....... 3721391

[51] Int. Cl.$^5$ ............................................. B65H 39/02
[52] U.S. Cl. ...................................... 270/58; 198/457
[58] Field of Search .......................... 270/52, 54, 58; 198/452, 457, 605

[56] References Cited

U.S. PATENT DOCUMENTS

| | | | |
|---|---|---|---|
| 3,302,539 | 2/1967 | Moffet | 270/54 |
| 3,819,173 | 6/1974 | Anderson | 270/58 |
| 4,280,615 | 7/1981 | Siniscal | 198/457 |
| 4,471,955 | 9/1984 | Bradley | 270/58 |
| 4,591,046 | 5/1986 | Toste | 198/457 |

FOREIGN PATENT DOCUMENTS 2109709  9/1972  Fed. Rep. of Germany ...... 198/457

Primary Examiner—Edward K. Look
Assistant Examiner—Therese M. Newholm
Attorney, Agent, or Firm—Chilton, Alix & Van Kirk

[57] ABSTRACT

Apparatus for selectively guiding printed sheets from the transport channel of a collating machine or the like comprises pairs of cooperating upper and lower clamping plungers which are driven by an arrangement of chains in a manner such that they execute and orbiting movement and are moved into the path on which the printed sheets to be intercepted move, the lower plungers of each pair extending through the transport surface. The pairs of clamping plungers move along a path which possesses a segment which is parallel to the direction of motion of the sheets and a contiguous downstream segment which leads angularly away from the initial motion path of the sheets. The clamping plungers are capable of selective actuation and when in the activated state clamp the printed sheets adjacent the leading and turning edges thereof and thus maintain the alignment thereof.

20 Claims, 3 Drawing Sheets

TRANSFERRING-OUT FACILITY

This is a continuation of co-pending application Ser. No. 210,394, filed on Jun. 23, 1988, now abandoned.

BACKGROUND OF THE INVENTION

1. Field Of The Invention

The present invention relates to the diversion of sheet material, particularly single or variable height stacks of loose sheets of printed paper, from a first path of movement onto a second movement path selectively and without a loss of alignment. More specifically, this invention is directed to apparatus for selectively engaging and guiding printed sheets out of the transport channel of a collating machine, along which such sheets are moving under the influence of pusher dogs, the intercepted sheets being caused to move along a surface that is inclined relative to the direction of motion established by the collating machine transport channel. Accordingly, the general objects of the present invention are to provide novel and improved methods and apparatus of such character.

2. Brief Description Of The Prior Art

While not limited thereto in its utility, the present invention is suited for use as a transferring-out facility wherein defective printed sheets or printed-sheet assemblages are removed from the stream of such sheets or sheet assemblages exiting a collating machine or the like. Collating machines, particularly in the book manufacturing industry, are provided with transport channels wherein the printed sheets are engaged by pusher mechanisms, known in the art as dogs, and caused to move in a first direction while being supported against an edge guide. When a defective sheet or stack of sheets is detected, it is necessary to eject such sheet or stack from the stream moving along the collating machine transport channel. U.S. Pat. No. 4,429,795 discloses a transferring-out facility of the type generally described above wherein defective printed-sheet assemblages are captured and ejected while the transport system of the associated collating machine is operating. In the apparatus of U.S. Pat. No. 4,429,795, the transferring-out facility includes a driven conveyor which is angularly oriented with respect to an inclined collating machine transport channel surface. An endless chain runs above the conveyor and supports a plurality of diverting pins which may selectively be caused to move between extended and retracted positions. When a defective printed-sheet assembly is sensed in the collating machine, and a signal commensurate therewith delivered to the transferring-out facility, a pair of these diverting pins are caused to be swung into the extended, i.e., downwardly projecting, position. These downwardly projecting pins pass through an aperture in the transport channel edge guide and intercept the side edge of a printed-sheet assembly which has been propelled by the pusher dogs and is bearing against the edge guide. The transport channel surface is provided with a longitudinal aperture and the diverting pins move within this aperture and thus begin to propel the defective printed-sheet assemblage out of the region in which the pusher dogs are effective and onto the conveyor.

The performance of the transferring-out facility of U.S. Pat. No. 4,429,795 is not entirely satisfactory because the loosely stacked printed sheets, which are resting against the collating machine pressure dogs and the transfer channel edge guide, have a tendency to become misaligned when struck by the diverting pins. This tendency toward misalignment is accentuated while the defective sheets are being conveyed upwardly at an angle and such misalignment occurs principally, but not exclusively, when the apparatus is operated at high repetition rates. Further, such operation at a high repetition rate has a tendency to cause damage to the printed sheets as a result of crushing. If the transferring-out facility of the referenced U.S. Pat. No. 4,429,795 is utilized for diverting very thin printed-sheet assemblages, such assemblages have a tendency to buckle while being guided to an upwardly inclined path defined by a conveyor, the thin printed-sheet assemblage moving in front of a pair of the diverting pins, and such bucking will lead to an interruption in operation.

SUMMARY OF THE INVENTION

The present invention overcomes the above-briefly discussed and other deficiencies and disadvantages of the prior art by providing a novel and improved technique and apparatus for guiding printed sheets from a transport channel, which defines a first path of motion, to a second motion path while preserving alignment to a high degree of accuracy, permitting high repetition rates and without subjecting the printed sheets to potentially damaging impacts along their edges or other unduly rough treatment.

The invention comprises a plurality of clamping systems which are arranged at equal distances from one another on axes which are perpendicular to the plane defined by the transport surface of the mechanism which is supplying the printed sheets. The plural clamping systems are driven, by an arrangement of chains for example, such that they execute an orbiting movement in synchronism with the pusher dogs which cooperate with the transport channel of the supplying machine. The clamping systems are supported and controlled such that they can be moved into the path on which the printed-sheet assemblages or individual printed sheets are moving so as to acquire assemblages or sheets which are to be transferred out of the movement path defined by the supplying machine transport channel. The clamping systems, because of their being driven in synchronism with the pusher dogs, arrive continuously at the path of motion of the sheets and, in part, extend through the transport surface on which the sheets are moving. Each of the clamping systems is formed by a leading clamping device and a trailing clamping device and each of these devices is defined by a pair of cooperating plungers which act on axes which are perpendicular to the aforesaid plane. The leading clamping device, when actuated, acts on the printed-sheet assemblage or printed sheet in the region of the leading edge thereof while the other clamping device will act in the region of the trailing edge of the "work", the axes of the cooperating plungers of the leading and trailing clamping devices defining a plane which is transverse to the sheet or sheet assemblage and parallel to the lengthwise edges thereof. The trailing clamping device will grip the printed-sheet assemblage or printed sheet adjacent the trailing edge thereof and in front of, and slightly offset relative to, the point of contact of the pusher dog which is propelling the sheet or sheet assemblage along the channel.

Continuing to discuss the preferred embodiment, the drive arrangement for the clamping device, typically a plurality of drive chains, defines a first track segment which runs parallel to the path of movement of the pusher dogs and a second or downstream track segment which diverges from the path of motion of the pusher dogs, the second track segment following an inclined transport surface upwardly at an angle. The inclined transport surface is provided with an aperture which corresponds to the path followed by the clamping devices and the lower plungers of each clamping device extend through this aperture.

Apparatus in accordance with the preferred embodiment of the invention also comprises actuating means for the upper plungers of the clamping devices whereby these upper plungers can be caused to be extended into contact with the printed sheet or printed-sheet assemblage in synchronism with the continuously moving pusher dogs, the control means also resulting in the retraction of the upper clamping plungers at the end of the above-mentioned second track segment.

The present invention enables printed-sheet assemblages or individual printed sheets to be guided from a collating machine or the like that is operated in the high-output range, this guiding or transferring-out being accomplished with the assemblages or individual sheets being in a clamped condition. Once having been transferred out in accordance with the apparatus and technique of the invention, the printed-sheet assemblages or individual sheets can be transferred to the transport system of another machine with their initial alignment preserved. The present invention also, even at very high repetition rates, provides damage-free transferring-out, even if the printed sheets being processed are of very widely different sizes, and even if such sheets are very delicate.

BRIEF DESCRIPTION OF THE DRAWING

The present invention may be better understood and its numerous objects and advantages will become apparent by reference to the accompanying drawing wherein like reference numerals refer to like elements in the several figures and in which.

DESCRIPTION OF THE ENCLOSED EMBODIMENT

With reference now to the drawings, a transferring-out facility in accordance with the invention would, by way of example, be installed in the delivery section of a collating machine. In the printing industry, printed sheets 1 stacked to form assemblages, are commonly continuously transported forwards on a transport surface 3 while bearing against an edge guide 3a. The transport surface 3 and edge guide 3a define a transport channel along which the sheets 1 are caused to move under the influence of pusher dogs 2. The transport surface 3 is customarily inclined, as may best be seen from FIG. 2, transversely with respect to a plane of movement defined by the axes of the serially arranged pusher dogs 2.

Figure 1:
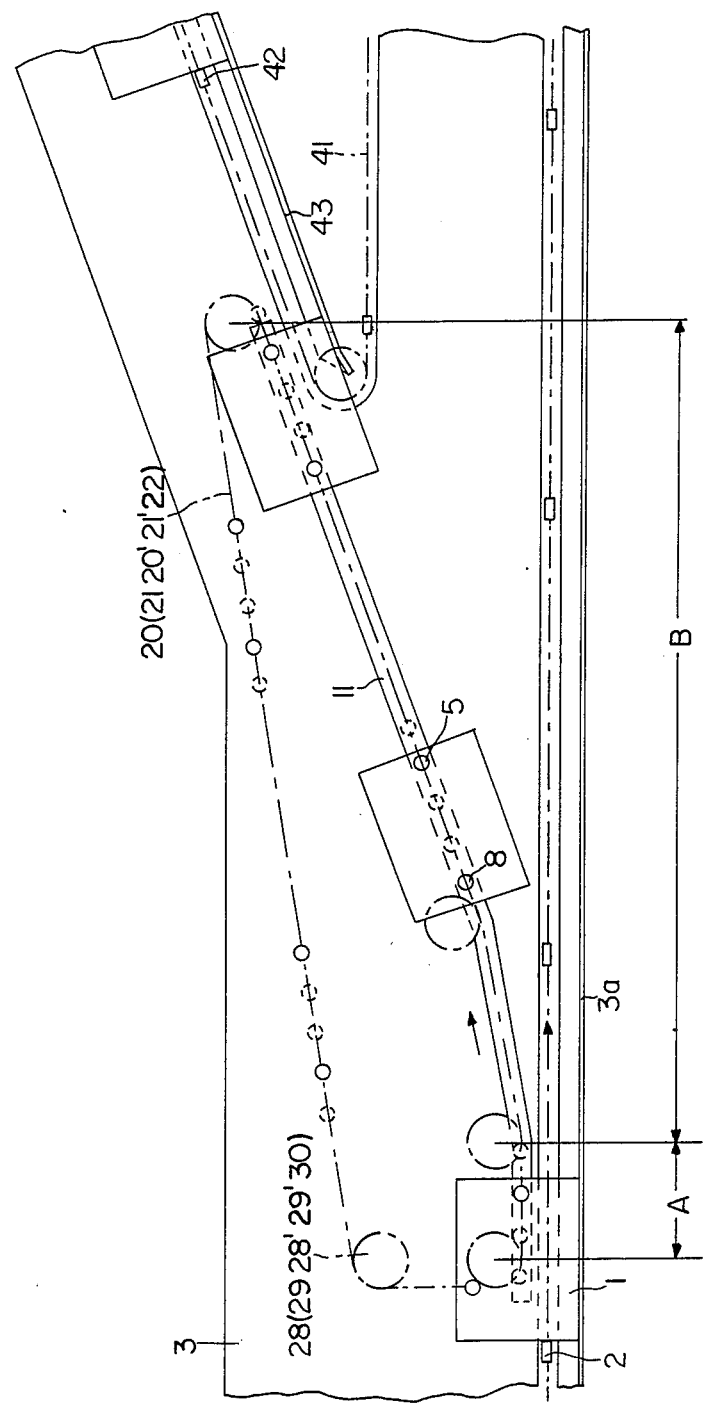
FIG. 1 is a schematic top view showing of apparatus in accordance with the invention.

The transferring-out facility is mounted on a machine frame in an inclined position determined by the angle of inclination of the transport surface 3. As shown in FIG. 1, the transport surface 3 defines a track segment A, wherein clamping devices 5 and 8, which will be discussed below, initially move in a direction which is parallel to the motion of the pusher dogs 2 at a defined lateral distance from the pusher dogs. The transport surface 3 also defines a track segment B wherein the path of motion of the clamping devices diverges away from the path of motion of the pusher dogs.

The transferring-out facility comprises a plurality of clamping systems which are arranged at equal distances from one another. These clamping systems each comprise a pair of clamping devices which, in part, extend to the transport surface 3 and which are successfully guided into the path on which the printed-sheet assemblages are moving. The axes of the clamping devices are arranged perpendicularly with respect to the transport surface 3, the clamping devices are caused to move in synchronism with the pusher dogs 2 and the path of motion of the clamping devices is determined by, in the disclosed embodiment, a drive system comprising endless drive chains.

Each of the clamping systems comprises a leading clamping device 5 and a trailing clamping device 8. The leading clamping devices 5 include an upper clamping plunger 6 and a cooperating lower clamping plunger, indicated at 7a in FIGS. 2 and 3. The trailing clamping devices each comprise an upper clamping plunger 9 and a cooperating lower clamping plunger indicated at 7b in FIG. 3. The upper plungers of each clamping device are, when actuated, resiliently biased against a sheet or sheet assemblage which is thus captured between the upper and lower plungers of a cooperating pair. The lower plungers of each clamping device extend through a longitudinal aperture 11 in the transport surface 3 and protrude slightly above surface 3.

Figure 2:
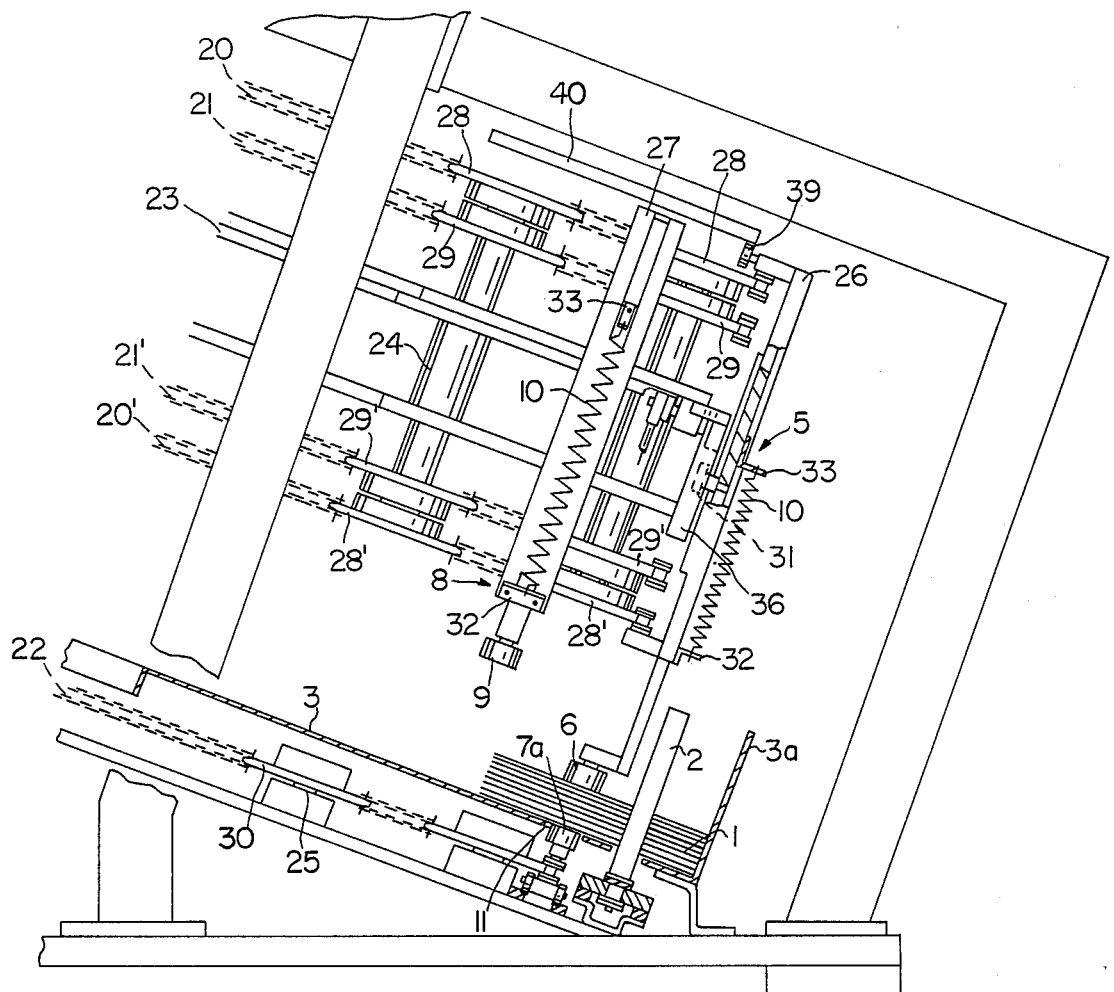
FIG. 2 is a side elevation view of apparatus in accordance with a first embodiment of the invention.
Figure 3:
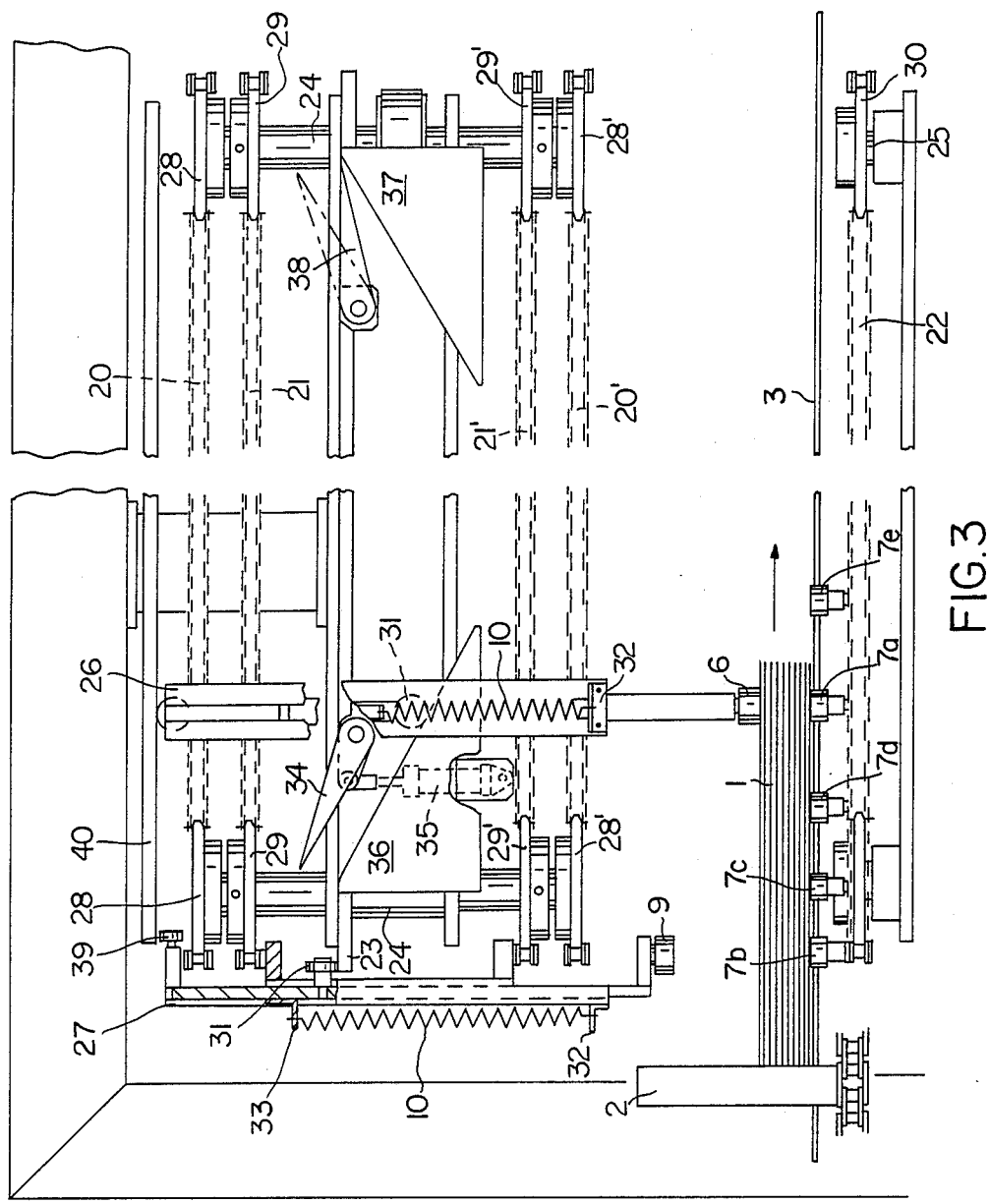
FIG. 3 is a front view, partly broken away and interrupted, of the apparatus of FIG. 2.

The chain drive system of the disclosed embodiment comprises a plurality of chains which are led around direction-changing sprockets, the axes of rotation of the sprockets being oriented perpendicularly with respect to the transport surface 3. Referring to FIGS. 2 and 3, the most inwardly disposed chains 21 and 21', with their respective sprockets 29, 29', are interconnected by means of guide profiles 27. The upper trailing clamping plungers 9 are located within the guide profiles 27 and are supported in a manner which allows free-sliding displacement thereof. The outwardly disposed of the chains located above the transport surface 3, i.e., the chains 20 and 20', cooperate with sprockets 28 and 28' and are interconnected by guide profiles 26 which carry the upper leading clamping plungers 6 in a manner which permits free-sliding displacement thereof. The drive chain system also comprises a separate lower chain 42 which cooperates with sprockets 30. Chain 22 carries the lower leading and trailing clamping plungers 7. The sprockets 28, 28', 29 and 29' are mounted on common axles 24 while the lower chain sprockets 30 are located on axles 25 which are coaxial with axles 24.

As previously noted, the drive system of the present invention is operated in synchronism with the pusher dogs 2. All of chains 20, 20', 21, 21' and 22 are transversely and vertically supported on guide tracks as they move on their endless paths.

The mounting of the upper leading and trailing clamping plungers, respectively 6 and 9, from separate pairs of drive chains via guide profiles, allows the spacing between the plungers to be adjusted to accommodate different sizes of printed sheet. To perform such an adjustment, the outside chains 20, 20' are detached from the drive and are shifted relative to the inside chains 21 and 21'. As may be seen from FIG. 3, lower leading clamping plungers 7c, 7d and 7e and mounted at fixed locations on the lower chain 22 and thus the size adjustment is accomplished by aligning the upper leading clamping plunger 6 with the appropriate lower leading clamping plunger.

In order to ensure that the printed-sheet assemblages are aligned with a lateral reference line while being transferred from one path of motion to another in accordance with the invention, it is necessary that the clamping plungers contact the sheet(s) along a line parallel to the lengthwise edges of the sheet(s). This is accomplished by causing the chains 20, 20', 21, 21' and 22 to initially run parallel to the path of motion of the pusher dogs 2 in the track segment A, the acquisition of the sheet(s) being accomplished during this time. The chains, and thus the clamped sheet(s), are subsequently led laterally away at an angle in the track segment B following the inclination of the transport surface 3.

The inclined transport surface 3, i.e., the surface along which the transferred out sheet(s) are directed, has a longitudinal aperture 11 which corresponds to the path followed by the drive chains. The lower clamping plungers 7a–7e extend through and move along the aperture 11.

To ensure that the printed-sheet assemblages 1 are clamped and conveyed securely and reliably, every clamping plunger is provided with a pressure surface which is comprised or coated with a non-slip material.

As previously noted, the upper clamping plungers 6 and 9 are mounted in respective guide profiles 26 and 27 so as to be moveable. This movement is necessary so that the upper clamping plungers may be raised and lowered as desired to capture a sheet or stack of sheets. Control over the extension and retraction of the upper clamping plungers is accomplished through the use of control rollers 31 which run on an orbital path 23 installed on the machine frame. The plungers 6 and 9 are held clear of the surfaces of the printed-sheet assemblages, i.e., are in the retracted position, while executing their orbiting movement.

Brackets 32 are located on the guide profiles 26 and 27, and brackets 33 are located on the clamping plungers 6 and 9. These brackets serve as attachment points for tension springs 10 which maintain the control rollers 31 in contact with the orbital path 23.

Mechanical switches 34 and 38 are installed in the orbital path 23. The switch 34 is situated in the region of the parallel-aligned track segment A of the chain system. Switch 34 is actuated by a cylinder 35 so as to cause the orbital path to be opened and closed. In the open condition, the control roller 31 associated with the clamping plunger runs onto a descending control path 36, and the associated clamping plunger is thus moved toward the printed-sheet assemblage 1 through the agency of the force exerted by the tension spring 10. Sequentially, the leading clamping plunger 6 will descend and clamp the sheet(s) between clamping plunger 6 and a selected lower clamping plunger 7. This is followed immediately by the clamping of the trailing region of the sheet(s) by the trailing clamping plungers 9 and 7b which results from the descent, on the control path 36, of the control roller 31 associated with the clamping plunger 9 and the application of a clamping force by means of the associated tension spring 10.

The opening action takes place at the end of the track segment B in a manner similar to the closing action, by virtue of the fact that the control rollers 31 run onto an ascending control path 37 and successively raise the clamping plungers 6 and 9. The opening action is accomplished by means of the switch 38. Switch 38 is pushed aside by the ascending control rollers 31 and automatically recloses the orbital path 23 once the control rollers have passed.

At their ends which face away from the transfer surface 3, the guide profiles 26 and 27 carry freely rotatable pressure rollers 39. Pressure rollers 39 bear against raceways 40 formed in the machine frame. The pressure rollers 39 provide support while the clamping plungers are applying a clamping force to a sheet or sheet assemblage.

The triggering of the mechanical switch 34, in order to actuate the clamping plungers 6 and 9, is synchronized with the motion of the continuously running pusher dogs 2. This triggering occurs, for example, after detection of a defective printed-sheet assemblage. It is to be noted, however, that the transferring-out facility of the present invention can be utilized for guiding a series of non-defective printed-sheet assemblages from a collating machine or the like, in which case the facility will operate continuously or, perhaps, in a preselected sequence such as alternatively.

Once guided out of the "normal" motion path, the printed sheet or stack of sheets can be transferred onward from the apparatus of the present invention to another downstream machine. This further transfer is accomplished by means of a connecting conveyor installation 41 with pusher dogs 42. The sheet or stack of sheets bear against a guide 43 while on conveyor 41 and their alignment is thus preserved.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A transferring-out facility for guiding printed sheets from the transport channel of a collating machine, said sheets bearing against an edge guide as they are transported forward in the transport channel by means of pusher dogs on an inclined transport surface, wherein a plurality of clamping systems are arranged at equal distances from one another, on axes perpendicular to the collating machine transport surface, the clamping systems being drivable by a chain drive in a manner such that the clamping systems execute an orbiting movement in synchronism with the collating machine pusher dogs and such that the clamping systems can be moved into the path on which the printed sheets are moving, the said clamping systems in part extending through the collating machine transport surface, each of the clamping systems being formed by a leading clamping device and a trailing clamping device, each of said clamping devices comprising an upper clamping plunger and a lower clamping plunger which cooperate as a spring biased pair in order to clamp the printed sheets, one clamping device acting on the printed sheet in the region of the leading edge, and the other clamping device acting on the printed sheet in the region of the trailing edge thereof, the regions of contact of the clamping devices with the printed sheet defining a line parallel to the lengthwise edge of the printed sheet, the said clamping devices being positioned relative to the pusher dog in a manner such that the trailing clamping device contacts the printed sheet in front in the direction of sheet movement of the pusher dog which is causing motion of the sheet, the chain drive defining a first track segment which runs parallel to the path of motion of the pusher dogs, this first track segment being contiguous with a second track segment which diverges from the path of motion of the pusher dogs while following the inclined transport surface, the inclined transport surface having an aperture which corresponds to the path followed by the clamping devices, through which aperture the lower clamping plunger extend, and within which aperture the lower clamping plungers move in the course of their orbiting movement, means for normally holding the upper clamping plungers clear of the surfaces of the printed sheets, first control means for permitting the upper clamping plungers to be lowered onto the printed sheets in synchronism with continuously moving pusher dogs under the influence of the spring biasing, and second control means for causing the upper clamping plungers to be raised in the region of the second track segment thus releasing the printed sheets.

2. The transferring-out facility as claimed in claim 1, wherein the chain drive comprises a first pair of chains, carrying the upper leading clamping plungers, a second pair of chains, carrying the upper trailing clamping plungers, and a lower chain, carrying the lower leading and lower trailing clamping plungers, the pairs of chains being led around direction-changing sprockets which are located on common axles, while the lower chain runs around direction-changing sprockets, the axles of the direction changing sprockets of the lower chain being separate from but aligned with the axles of the sprockets for the upper pairs of chains.

3. The transferring-out facility as claimed in claim 2, wherein the upper leading clamping plungers and the upper trailing clamping plungers are mounted in guide profiles, in a manner allowing free-sliding displacement, the guide profiles respectively interconnecting the chains of a respective pair, the said clamping plungers being moved towards the surfaces of the printed sheets in response to the force exerted by associated tension springs which act on the guide profiles and on the said plungers, the guide profiles being supported at their ends that face away from the printed sheet.

4. The transferring-out facility as claimed in claim 3, wherein the upper clamping plungers carry control rollers which run on an orbital path and hold the said plungers clear of the surfaces of the printed sheets counter to the effect of the tension springs.

5. The transferring-out facility as claimed in claim 4, wherein said first control means comprises a controllable mechanical switch disposed in said orbital path in the region of the first parallel track segment, the function of said switch being to open the orbital path and to cause the upper clamping plungers to be diverted to and follow a descending control path.

6. The transferring-out facility as claimed in claim 5, wherein said second control means comprises a further mechanical switch disposed in the region of the end of the second track segment, the said further switch operable in order to allow the upper clamping plungers to ascend to the said orbital path as a result of their control rollers running onto an ascending control path.

7. The transferring-out facility as claimed in claim 1, wherein the chains associated with the upper leading clamping plungers can be shifted relative to the chains associated with the upper trailing clamping plungers, either in the chain running direction or in the opposite direction, so as to effect adjustment to suit different sizes of printed sheet.

8. The transferring-out facility as claimed in 7, wherein the lower chain carries further clamping plungers, with which the upper clamping plungers are aligned during adjustment to suit different sizes of printed sheet.

9. The transferring-out facility as claimed in claim 1, wherein the clamping plungers are provided with a non-slip material on at least a part of the surfaces which contact the printed sheets.

10. Apparatus for selectively changing the direction of motion of sheets which are caused to travel along a transport surface in a first direction by pusher devices, said apparatus comprising:

a plurality of clamping systems, each of said clamping systems comprising a leading clamping device and a trailing clamping device, each of said clamping devices comprising cooperating upper and lower clamp means;

support means for said clamping systems, said support means positioning said clamping systems substantially equidistant from one another;

means for imparting movement along a closed path to said clamping systems, said clamping system movement being synchronized with the movement of the pusher devices which are causing the travel of the sheets along the transport surface, said motion imparting means defining a multi-segmented motion path for said clamping devices, a first path segment being linear and parallel to the direction of motion of the pusher devices and a second adjoining path segment being angularly oriented with respect to said first path segment, said second path segment being linear and parallel to a reference line;

means for selectively causing at least one of the clamp means of each clamping device of a clamping system to move in a direction which is transverse to the direction of motion of the sheets during motion of the said clamping device along the said first path segment whereby a sheet will be clamped between the cooperating clamp means of each clamping device; and means for causing clamp means which have been moved transversely to return to their initial positions during subsequent motion thereof along said multi-segmented motion path whereby a clamped sheet will be aligned with said reference line when released by said clamping devices.

11. The apparatus of claim 10 wherein said leading and trailing clamping devices of each of said clamping systems are independently operable and wherein said clamp means comprises plungers, at least one of said plungers being reciprocally movable relative to the other and wherein said clamping devices each further comprise means for guiding the reciprocal relative motion.

12. The apparatus of claim 11 wherein said means for imparting movement to said clamping systems comprises:

a first pair of drive chains and cooperating sprockets;

a second pair of drive chains and associated sprockets;

a third drive chain and associated sprockets;

means coupling the upper clamp means of the leading clamp devices to said first pair of drive chains;

means coupling the upper clamp means of the trailing clamping devices to the chains of said second pair of drive chains; and means coupling said lower clamp means to said third drive chain.

13. Apparatus for selectively changing the direction of motion of a sheet which is initially traveling along a transport surface in a first direction, said apparatus comprising:

a plurality of clamping means, each of said clamping means comprising a leading clamping device and a trailing clamping device, each of said clamping devices comprising cooperating upper and lower clamping plungers, the upper clamping plungers of said clamping devices being reciprocally moveable relative to the lower clamping plungers in a direction which is transverse to the initial direction of motion of the sheet, said clamping means further comprising means for guiding the reciprocal motion of said upper clamping plungers;

support means for said clamping means, said support means positioning said clamping means substantially equidistant from one another;

means for imparting movement along a closed path to said clamping means, said movement of said clamping means being synchronized with the movement of the sheet along the transport surface, said motion imparting means defining a multi-segmented motion path for said clamping devices, a first path segment being parallel to the initial direction of motion of the sheets and a second path segment being angularly oriented with respect to said initial direction of motion;

a control roller connected to each of said upper plunges;

track means defining an orbital motion path for said control rollers, said track means defined path being spaced from the transport surface a sufficient distance to prevent contact between said clamp means and a sheet traveling on said transport surface;

switch means for diverting said control rollers from said orbital path in the direction of said transport surface, said switch means including means defining a clamping path;

spring means for biasing each of said upper clamping plungers in the direction of the transport surface, said spring means causing movement of an associated upper plunger into contact with a sheet traveling on the transport surface when the associated control roller is diverted onto said clamping path by said switch means whereby the sheet will be clamped between cooperating upper and lower clamping plungers; and means for causing upper clamping plungers which have been moved transversely to return to their initial positions when their associated control rollers reach the end of said clamping path.

14. The apparatus of claim 13 wherein said means for causing transversely moved upper clamping plungers to return to their initial position comprises:

means for directing said control rollers back onto said orbital motion path.

15. The apparatus of claim 14 wherein said means for imparting movement to said clamping means comprises:

a first pair of drive chains and cooperating sprockets;

a second pair of drive chains and associated sprockets;

a third drive chain and associated sprockets;

means coupling the upper clamping plungers of the leading clamp devices to said first pair of drive chains;

means coupling the upper clamping plungers of the trailing clamping devices to the chains of said second pair of drive chains; and means coupling said lower clamping plungers to said third drive chain.

16. The apparatus of claim 14 wherein said clamping devices further comprise guide profile means for determining the direction of movement of said upper plungers, said guide profile means being connected to said motion imparting means for movement therewith.

17. The apparatus of claim 15 wherein said clamp means further comprise guide profile means for determining the path of movement of said upper plungers, said guide profile means being connected to said drive chains of said first pair for movement therewith.

18. The apparatus of claim 15 wherein said chains of at least one of said first and second pairs of chains may be advanced relative to the chains of said other pair whereby said clamp means may be adjusted to accommodate different sizes of printed sheet.

19. The apparatus of claim 6 wherein said chains of at least one of said first and second pair of drive chains may be advanced relative to the chains of said other pair, whereby said clamping systems may be adjusted to accommodate different sizes of printed sheet.

20. The apparatus of claim 19 wherein said clamping plungers are provided with a non-slip material on at least a part of the surfaces thereof which contact the printed sheets.

* * * * *